(12) United States Patent
Wagner et al.

(10) Patent No.: US 10,220,653 B2
(45) Date of Patent: Mar. 5, 2019

(54) COMPOSITE WHEEL AND INSERT

(71) Applicant: MUBEA CARBO TECH GMBH, Saltzburg (AT)

(72) Inventors: Karl Wagner, Salzburg (AT); Georg Ruzicka, Gmünd (AT); Christoph Renner, Gosau (AT)

(73) Assignee: MUBEA CARBO TECH GMBH, Salzburg (AT)

( * ) Notice: Subject to any disclaimer, the term of this patent is extended or adjusted under 35 U.S.C. 154(b) by 314 days.

(21) Appl. No.: 14/914,538

(22) PCT Filed: Aug. 18, 2014

(86) PCT No.: PCT/EP2014/067590
§ 371 (c)(1),
(2) Date: Feb. 25, 2016

(87) PCT Pub. No.: WO2015/028337
PCT Pub. Date: Mar. 5, 2015

(65) Prior Publication Data
US 2016/0200138 A1    Jul. 14, 2016

(30) Foreign Application Priority Data

Aug. 30, 2013 (CH) ........................................ 1473/13

(51) Int. Cl.
*B60B 5/02* (2006.01)
*B29C 65/56* (2006.01)
(Continued)

(52) U.S. Cl.
CPC .............. *B60B 5/02* (2013.01); *B29C 65/562* (2013.01); *B29C 65/70* (2013.01); *B60B 1/08* (2013.01); *B29L 2031/3002* (2013.01); *B60B 1/06* (2013.01); *B60B 3/10* (2013.01); *B60B 3/12* (2013.01); *B60B 2310/204* (2013.01); *B60B 2310/52* (2013.01); *B60B 2360/34* (2013.01); *B60B 2360/341* (2013.01); *B60B 2360/344* (2013.01); *B60B 2360/36* (2013.01);
(Continued)

(58) Field of Classification Search
CPC .. B60B 3/16; B60B 3/12; B60B 3/087; B60B 3/08; B60B 5/02; B60B 1/08; B29C 65/562; B29C 65/70; B29C 65/62
USPC ..................................................... 301/35.626
See application file for complete search history.

(56) References Cited

U.S. PATENT DOCUMENTS 3,917,352 A    11/1975 Gageby
4,461,515 A *   7/1984 Gwyneette et al. ...... B60B 3/00
                                                      301/63

(Continued)

FOREIGN PATENT DOCUMENTS

CN            103974834 A      8/2014
DE    10 2005 041 940 A1      3/2007
(Continued)

*Primary Examiner* — Kip T Kotter
*Assistant Examiner* — Scott A Browne
(74) *Attorney, Agent, or Firm* — Pauley Erickson & Kottis

(57) ABSTRACT

The invention is directed to wheel (1) comprising a rim (2) and a wheel center (3). The wheel center (3) comprises and insert (10) which at least comprises a front pad (11) and a rear pad (12) which are a distance apart with respect to each other and which are at least partially embedded in a composite material (6).

20 Claims, 4 Drawing Sheets

(51) Int. Cl.
    *B29C 65/70*     (2006.01)
    *B60B 1/08*     (2006.01)
    *B29L 31/30*     (2006.01)
    *B60B 1/06*     (2006.01)
    *B60B 3/10*     (2006.01)
    *B60B 3/12*     (2006.01)

(52) U.S. Cl.
    CPC .... *B60B 2900/111* (2013.01); *B60B 2900/311* (2013.01); *B60Y 2200/10* (2013.01); *Y02T 10/86* (2013.01)

(56) References Cited

U.S. PATENT DOCUMENTS

| | | | | |
|---|---|---|---|---|
| 4,900,097 | A * | 2/1990 | Kostov | B60B 5/02 301/35.626 |
| 5,022,712 | A * | 6/1991 | Woelfel | B60B 5/02 301/35.632 |
| 5,454,628 | A * | 10/1995 | Maiworm et al. | B60B 1/08 301/35.632 |
| 9,724,961 | B2 * | 8/2017 | Renner | B60B 3/004 |
| 9,745,341 | B2 * | 8/2017 | Vlahov | C07K 5/06139 |
| 2005/0121970 | A1 | 6/2005 | Adrian | |
| 2013/0026816 | A1 | 1/2013 | Kia et al. | |
| 2014/0346845 | A1 | 11/2014 | Renner | |
| 2016/0193869 | A1 * | 7/2016 | Renner | B60B 1/006 301/64.703 |

FOREIGN PATENT DOCUMENTS

| | | |
|---|---|---|
| DE | 10 2010 010 513 A1 | 9/2011 |
| DE | 10 2011 077 834 A1 | 12/2012 |
| DE | 10 2011 087 936 B3 | 2/2013 |
| DE | 10 2011 087938 A1 | 6/2013 |
| EP | 0 282 008 A2 | 9/1988 |
| EP | 2 412 543 A1 | 2/2012 |
| EP | 2 567 830 A2 | 3/2013 |
| GB | 1 372 357 A | 10/1974 |
| JP | 2-128958 A | 5/1990 |
| WO | WO 03/061933 A1 | 7/2003 |
| WO | WO 2011/000070 A1 | 1/2011 |
| WO | WO 2013/000009 A1 | 1/2013 |
| WO | WO 2013/083123 A1 | 6/2013 |
| WO | WO 2013/083729 A2 | 6/2013 |
| WO | WO 2013/083500 A1 | 7/2013 |

* cited by examiner

COMPOSITE WHEEL AND INSERT

BACKGROUND OF THE INVENTION

1. Field of the Invention

The present invention is directed to a wheel with a wheel center made out of composite material and an insert arranged at the wheel center of such a wheel.

2. Discussion of Related Art

WO2013083729 was published in June 2013 in the name of the same applicant. The document is directed to a high performance wheel made of a fiber reinforced material. The wheel comprises an insert in the hub region which is partially embedded in the composite material. The insert includes strengthening inlays which may be made of a metal or ceramic material or fiber reinforced material.

WO13000009 was published in January 2013 on behalf of Carbon Revolution Pty Ltd. The application is directed to an attachment arrangement for use in attaching a composite wheel to a mount, providing improved loading of the composite material. The attachment arrangement comprises an elongate fastener element, which is inserted into at least one fastening aperture and a corresponding fastening nut. A sleeve is configured to extend into the attachment aperture of the composite wheel. The arrangement allows stiff fastening to the mount relative to the fastening nut without damaging the composite wheel.

JP2128958 was published in May 1990 on behalf of Honda Motor Co. Ltd. It is directed to a composite wheel. In the disc region, the wheel comprises an insert made of a fiber reinforced resin which has increased anti-creeping properties compared to the surrounding fiber-reinforced resin. The insert has a disc-like shape and is inserted by hot pressure molding process in a single piece with the body.

WO13083500 was published in June 2013 on behalf of Thyssen Krupp Carbon Components GmbH. It is directed to a wheel comprising a wheel spider comprising spokes made of linear textile strands. In a wheel according to the document, the spokes are formed by the linear textile strands which extend continuously from the rim to the hub and back to the rim. The hub may be built of a metal or a fiber reinforced plastic and comprise recesses or dowel-type bumps through/around which the textile strands are deflected.

WO11000070 was published in January 2011 on behalf of Plascar Industria de Componentes Plasticos LTDA. The application is directed to a wheel made out of a polymeric composite material comprising a homogeneous mixture of a thermoplastic matrix and synthetic fibers, made in a single piece by an injection process. The document further describes the use of different types of metallic inserts in the wheel's hub region in order to reinforce the connection of the wheel to a vehicle.

The wheels known from the prior art in general do not provide a sufficient load capacity with respect the weight of the wheel.

SUMMARY OF THE INVENTION

One object of the present invention is to provide a wheel with an improved performance compared to the prior art.

In an embodiment a wheel according to the invention comprises a rim and a wheel center. At least the wheel center is made out of composite material and comprises an insert. The insert has a layered setup with a front pad and a rear pad, which are spaced a distance apart with respect to each other and which are at least partially embedded in a composite material. The front pad and the rear pad are responsible for optimized load transmission and distribution between the rim and a hub of a vehicle to which the wheel is attached. Depending on the field of application and the load to be transmitted, at least one intermediate pad may be arranged between the front pad and the rear pad.

For optimized load transmission, at least one layer of reinforcing fibers is arranged between the front pad and the rear pad. In the final product the fibers are embedded in a matrix material. In a variation of the wheel with improved performance, at least one layer of reinforcing fibers is attached to the rim and therefore provides a mechanical connection between the insert and the rim. The at least one layer of reinforcing fibers may extend across at least one transversal opening in the rim. It is then attached to the rim close to the outer surface of the rim. If appropriate it may be covered on the outside e.g. by additional layers of composite material.

For good and balanced distribution of the occurring mechanical loads at least one pad has an in principle annular shape which surrounds a center opening. For supporting the wheel in radial direction with respect to the hub at least one pad may have a radial projection which extends into the center opening and merges into a support which interacts in a mounted position of the wheel with a corresponding hub of a vehicle.

At least one pad may be interconnected to the composite material by at least one mechanical element. Good results are achieved when at least two pads are mechanically interconnected to each other by at least one mechanical element, which extends across the composite material. The mechanical element interconnecting at least two pads may be foreseen to define the distance between the pads.

The at least one mechanical element may e.g. comprise a bushing and/or a filament and/or a pin and/or a pyramid and/or a inverse-pyramid. The mechanical elements may form part of a pad or be attached to a pad, e.g. by gluing and/or riveting and/or sewing and/or welding and/or force fitting. E.g. good results are achieved when the pads comprise recesses (bores) through which a filament (e.g. a bundle of fibers, resp. rowing) can be inserted which extends across several pads and several layers of reinforcing fibers (respectively composite material) and by which the several elements are tied together. Alternatively or in addition the several pads and layers of composite material may be tied together by rivets and/or bolts. The rivets and/or the bolts may be applied before and/or after the matrix in which the reinforcing fibers of the composite material are embedded is cured. The mechanical elements may comprise bushings suitable to receive bolts by which the wheel can be attached to a hub of a vehicle.

At least two pads may comprise at least one peripheral opening and/or at least one recess, which are arranged corresponding to each other, such that they are suitable to receive at least one mechanical element which extends across both. Preferably at least one pad is made out of metal, e.g. sheet metal. At least one pad may have a three-dimensional shape with non flat sides, i.e. which protrudes out of a plane.

A method for assembling a wheel according to the present invention in principle comprises the following method steps: Arranging a front pad and a rear pad between several layers of reinforcing fibers. Arranging the pads and the layers of reinforcing fibers in a mold which is relevant for the final shape of the product. The mold preferably comprises positioning means to precisely position the pads with respect to the mold. If not yet present, embedding the reinforcing fibers in a matrix material. In a further step the matrix material is cured. If appropriate at least one intermediate pad is arranged between the front pad and the read pad. To improve mechanical stability and precision, the pads may be interconnected to each other by at least one mechanical element. The mechanical element can e.g. be out of the group of the following elements or a combination thereof: Filament, Bushing, Bolt, Pin. Depending on the design, the at least one mechanical element is applied before and/or after the matrix is cured. In a variant a pre-assembled rim is arranged in the mold before the matrix material is cured. The rim may be made out of composite material and/or a metal alloy, e.g. Aluminum. To improve stability and mechanical durance, the fibers of a layer of reinforcing fibers are arranged in a transversal opening and attached to the outside of the rim. If appropriate the fibers are covered from the outside by an additional layer of material.

Good results are achieved when at least the surfaces of the pads are exposed to a surface treatment before the composite material is attached to them. Depending on the field of application, e.g. sand blasting and/or coating by a primer in principle has a positive effect regarding the strength and durability of the bonding.

BRIEF DESCRIPTION OF THE DRAWINGS

The herein described invention will be more fully understood from the detailed description given herein below and the accompanying drawings, which should not be considered as limiting to the invention described in the appended claims.

DETAILED DESCRIPTION OF THE INVENTION

The foregoing summary as well as the following detailed description of the preferred embodiments is better understood when read in conjunction with the appended drawings. For the purposes of illustrating the invention, several embodiments that are presently preferred, in which like numerals represent similar parts throughout the several views of the drawings, it being understood, however, that the invention is not limited to the specific methods and instrumentalities disclosed.

Figure 1:
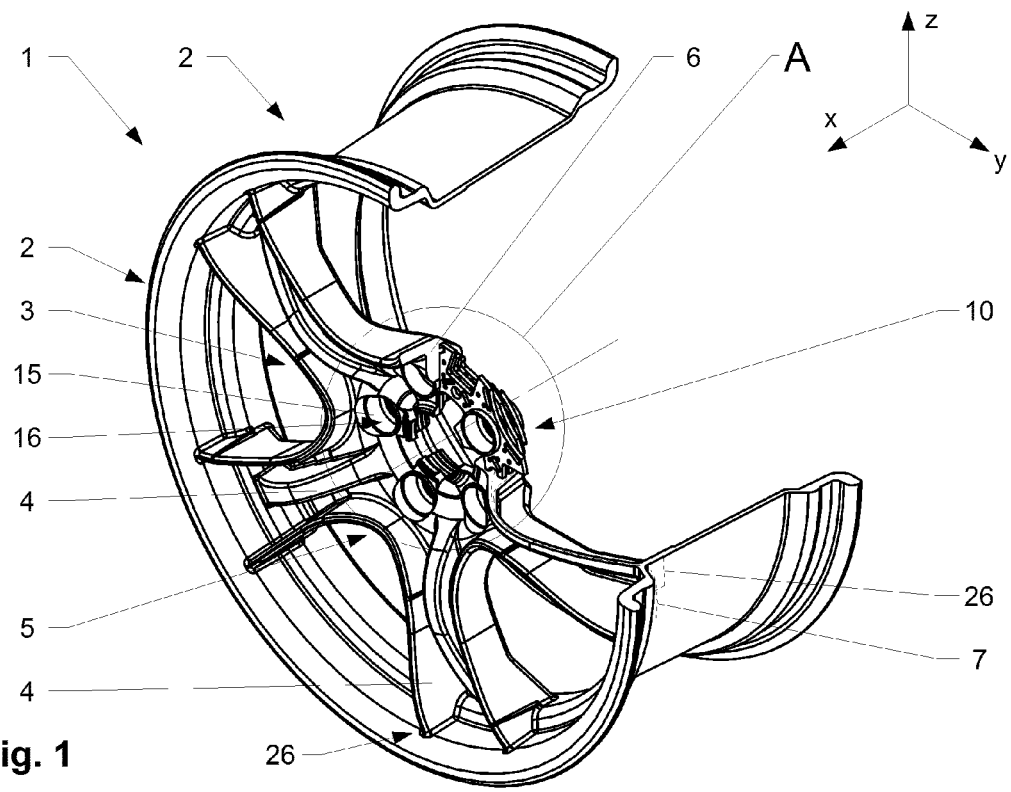
FIG. 1 shows in a perspective view a wheel in a partially cut manner.

FIG. 1 shows an embodiment of a wheel 1 according to the invention in a partially cut manner, such that the inside of the wheel becomes visible.

The wheel 1 comprises a rim 2 and a wheel center (spoke structure) 3. The wheel center 3 comprises several spokes 4 which at their outer end merge into the rim 2 and at the inner end merge into a wheel flange 5. The elements described above are primarily made out of composite material 6 comprising reinforcing fibers embedded in matrix material. The composite material is made by resin transfer molding (RTM) and/or application of prepreg material and/or injection molding.

Especially with high performance wheels, e.g. for race cars, one technical problem is the transfer of load between the wheel 1 and a hub of a vehicle (both not shown in detail) to which the wheel 1 is attached. For a general introduction of the problem, we hereby refer to WO2013083729 of the same applicant.

The wheel flange 5 comprises a first embodiment of an insert 10 having a special design as will be described subsequent in more detail.

Figure 2:
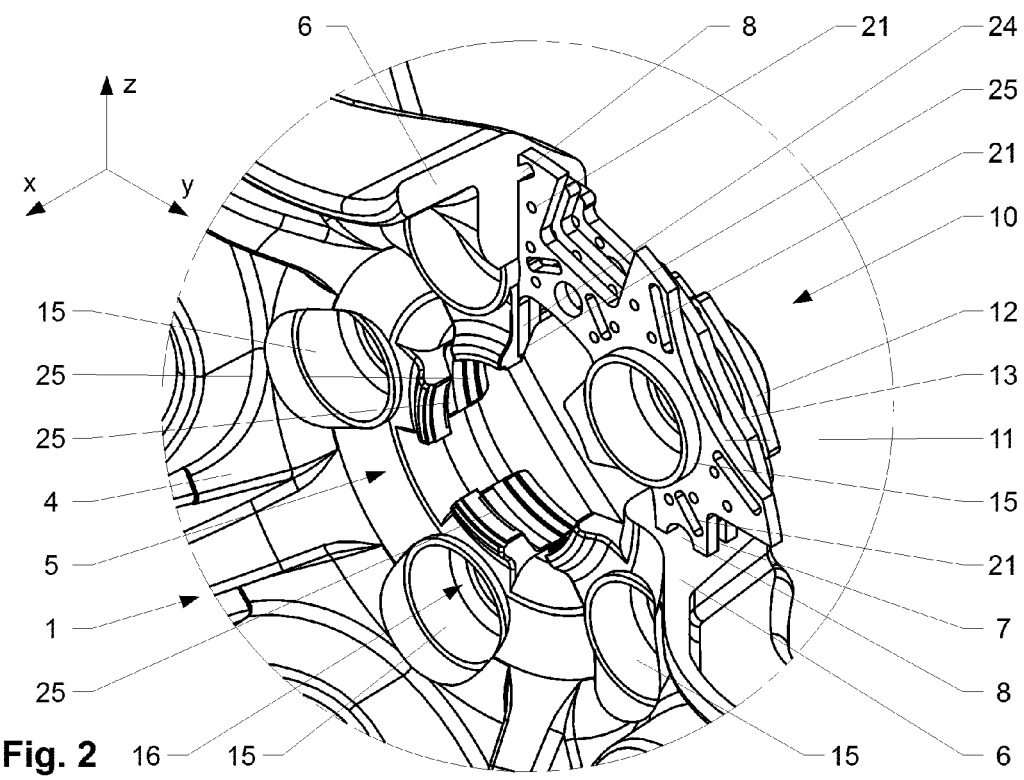
FIG. 2 shows detail A according to FIG. 1 in a scaled up manner.
Figure 3:
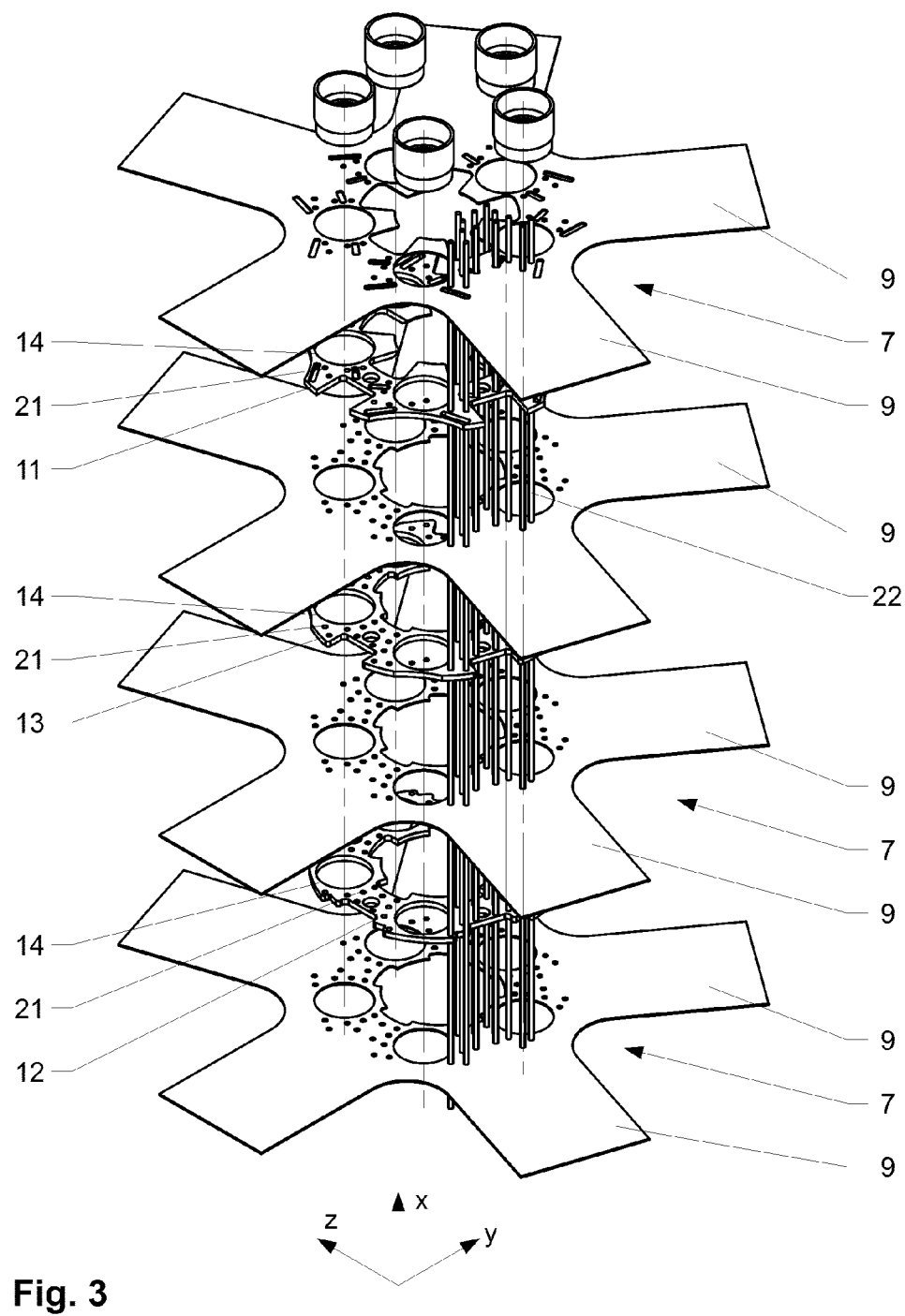
FIG. 3 shows assembling of a wheel center.
Figure 4:
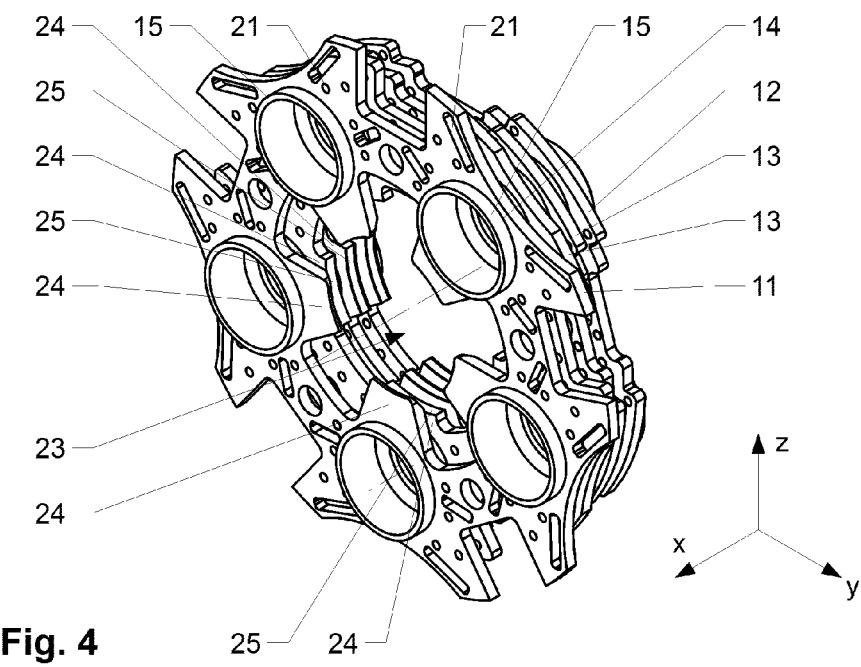
FIG. 4 shows a first embodiment of an insert in a perspective view.
Figure 5:
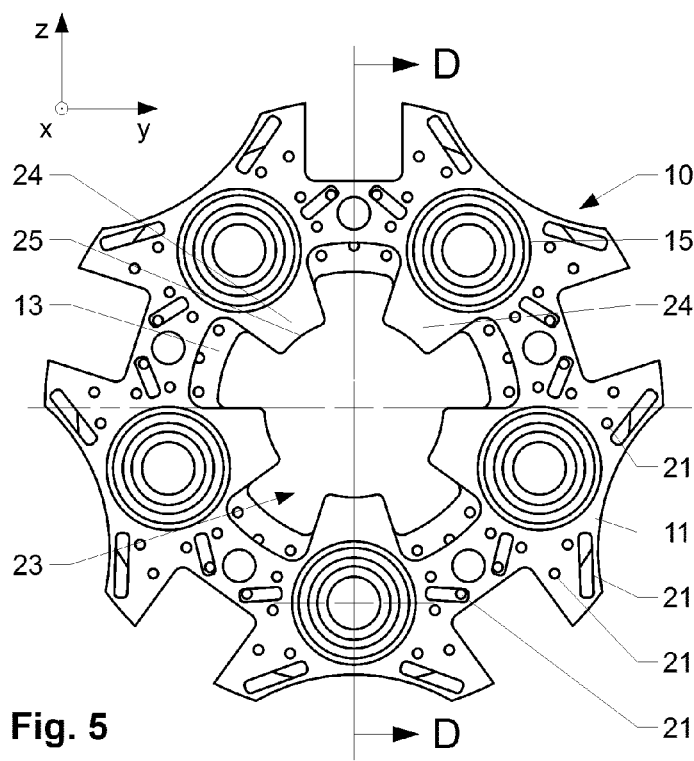
FIG. 5 shows the insert according to FIG. 4 in a front view.
Figure 6:
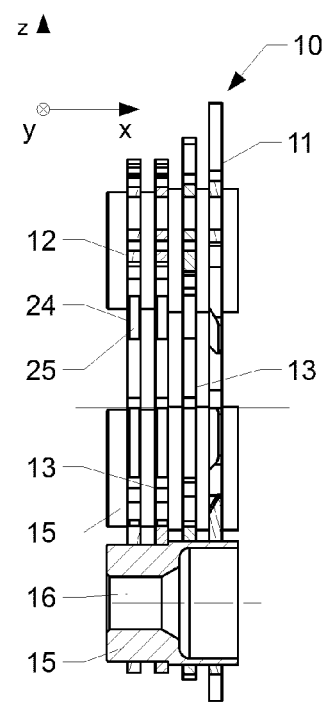
FIG. 6 shows a section view of the insert along section line DD according to FIG. 5.
Figure 7:
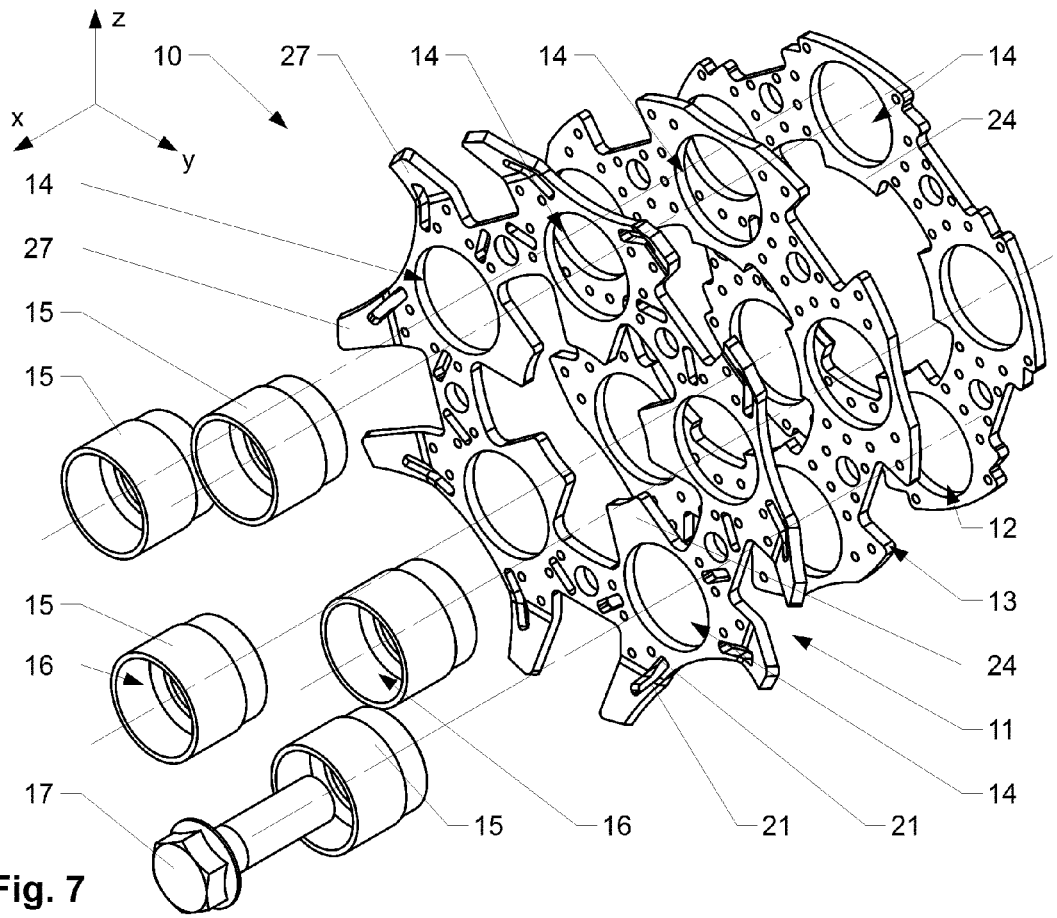
FIG. 7 shows the insert according to FIG. 3 in an exploded view.
Figure 8:
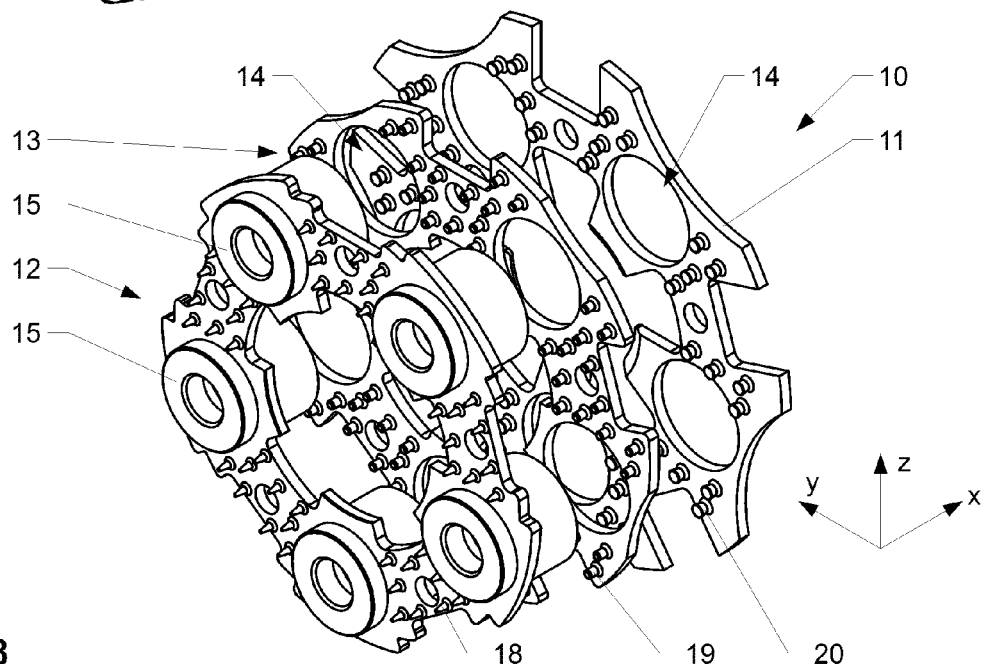
FIG. 8 shows a second embodiment of an insert in an exploded view.

FIG. 2 shows detail A according to FIG. 1 in a scaled-up manner. The insert 10 is partially visible in the area where the composite material 6 is cut apart over an angle of 90° in circumferential direction. FIG. 3 shows in a schematic manner assembling of a wheel center 3 and an insert 10. FIG. 4 shows the insert 10 in an isolated manner in a perspective view. FIG. 5 shows the insert 10 in a front view and FIG. 6 in a section view according to section line DD according to FIG. 5. FIG. 7 shows the insert 10 in an exploded view with respect to x-direction. FIG. 8 shows a variation of an insert 10.

As it can be seen in FIGS. 1-8, the insert 10 comprises a layered setup which provides several advantages over the prior art, such as improved load capacity and performance compared to wheels known from the prior art. In the shown embodiment, the insert 10 comprises a front pad 11 and a rear pad 12 and at least one intermediate pad 13. Depending on the field of application and the size of the wheel 1, the at least one intermediate pad 13 can be avoided.

Each pad 11, 12, 13 comprises several peripheral openings 14 arranged coaxial to each other with respect to the x-direction. The openings 14 are suitable to receive bushings 15 for load application and transfer. In the shown embodiment, the bushings 15 at the same time serve to attach the wheel 1 to a hub (not shown in detail) by bolts 17 (only one shown). Therefore, the bushings 15 each comprise a staged hole 16, which is suitable to receive the bolts 17.

Alternatively or in addition, the insert 10 may comprise other mechanical elements arranged adjacent to or extending across at least one of the pads 11, 12, 13 and improve the mechanical interaction between the composite material 6 and the insert 10, which is embedded as shown in FIG. 1 which is at least partially embedded in the composite material 6.

FIG. 3 schematically shows assembling of a wheel center 3 and an insert 10. The elements which are assembled are shown in an exploded manner. In reality, the pads 11, 12, 13 and the layers of composite material 7 are stacked (layered) on top of each other. In a first step, several pads 11, 12, 13 are arranged between several layers of reinforcing fibers 7, which are cut according to a predetermined pattern, which is related to the pads 11, 12, 13 of the insert 10 and the wheel 1 to be made. The layers of reinforcing fibers 7 themselves may comprise several layers of reinforcing fibers. The layers 7 of reinforcing fibers may consist of a fabric of reinforcing fibers.

In the shown embodiment, the layers of reinforcing fibers 7 comprise arms 9 extending in a radial direction. In the final product the arms 9 form part of the spokes 4 of the wheel 1 as shown in FIG. 1. In an preferred embodiment, they loop around part of the insert 10 and attach to the rim 2, e.g. in that they reach across at least one transversal opening 26 (schematically indicated by dotted lines in FIG. 1) in the rim 2 and are attached to the rim 2 close to the outer surface of the rim 2. They may be covered by additional material on the outside.

During stacking of the fibers, the matrix embedding the layers of reinforcing fibers is not yet applied or not yet cured completely cured. Therefore, the layers of reinforcing fibers 7 are still deformable. The layers of reinforcing fibers 7 may comprise dry reinforcing fibers (not shown in detail) not yet embedded in a matrix material. Alternatively or in addition, the layers of reinforcing fibers may consist of a prepreg with a non-cured or semi-cured matrix material.

The pads 11, 12, 13 each comprise several recess 21 which extend in lateral direction and are arranged congruent with respect to each other. The recess 21 are foreseen to receive mechanical elements here in the form of a filament 22 (e.g. in the form of a bundle of fibers (rowing), which in a mounted position ties the pads 11, 12, 13 and the layers of reinforcing fibers 7, i.e. the composite material 6 arranged between the pads 11, 12, 13 together. The filament 22 is applied in a kind of sewing process in that it is stitched by a needle into the recesses 21. In the assembled position, the recesses 21 may be filled by matrix material and/or fibers forming bridges of composite material 6 (see FIG. 1). The recesses 21 may have difference sizes and shapes, e.g. round or elongated. Recesses 21 with an elongated shape preferably serve for looping of reinforcing fibers which extend into other structural elements of the wheel 1 such as the spokes 4.

Certain recesses may be foreseen for other purposes such as positioning and adjusting of the wheel 1 with respect to the hub of a vehicle (both not shown in detail). In this case the material arranged in this special recesses is removed If appropriate, the recesses may be foreseen to receive other mechanical elements, such as bolts or pins, to improve the mechanical interaction between the pads 11, 12, 13. The mechanical elements described herein may be applied before and/or after curing of the matrix of the composite material 6.

After the layers of reinforcing fibers 7 and the pads 11, 12, 13 are stacked, they are transferred into a mold (not shown in detail) which is suitable to receive them and which shapes the final product. They normally comprise means which interact with the pads 11, 12, 13 and position them in a precise manner. If appropriate, other elements are positioned in the mold before or after. In an embodiment, the rim 2, which is made as separate part, is placed in the mold. The rim 2 comprises transversal openings in the rim 2, which are suitable to receive reinforcing fibers which encompass the insert 10 and end at the outside of the rim 2. If appropriate, said reinforcing fibers may form at least one loop (not shown in detail) around the insert 10. If required, matrix material is applied in a further step, e.g. by a resin transfer (RTM) molding process. After the matrix material is cured the elements are removed from the mold. In a further step the bushings 15 are applied to the elements in that they are inserted into the peripheral openings 14.

FIG. 4 shows an insert 10 in an isolated manner in a perspective view. FIG. 5 shows the insert 10 in a front view and FIG. 6 in a section view along section line DD according to FIG. 5. The insert 10 shown here comprise a front pad 11 and a rear pad 12 and two intermediate pads 13. In the shown variant, the pads 11, 12, 13 are made out of flat sheet metal. If appropriate, they can themselves have three dimensionally shaped structure which is non-flat. The pads 11, 12, 13 have in principle an annular shape with a center opening 23. Several projections 24 extend into the center opening 23, where they merge into a support 25 which in the final product 1 locally protrude above the surface of the composite material 6 (see FIG. 1). In the shown embodiment, the projections 24 and the supports 25 are correlated to the peripheral openings 14 and the bushings 15. In the final product 1, the spokes 4 are arranged between bushings 15 which results in optimized load distribution.

FIG. 7 shows an insert 10 in an exploded view. As it can be seen the pads 11, 12, 13 can have a flat design (see rear and intermediate pads 12, 13) and/or a three dimensionally shaped design. In the shown embodiment, wings 27 of the front pad 11 are bend out of plane (y-z). Variations are possible. Good results are achieved when at least the surfaces of the pads 11, 12, 13 are exposed to a surface treatment before the composite material 6 is attached to them. Depending on the field of application, e.g. sand blasting and/or coating by a primer in principle has a positive effect regarding the strength and durability of the bonding.

In FIG. 8 three examples of pins 18, 19, 20 which act as mechanical elements are shown. The pins 18, 19, 20 are forming part of the patches 11, 12, 13 or are attached thereto. The first example of pins 18 arranged at the rear pad 12 have a pyramidal shape which supports intrusion e.g. into a layer of non-cured reinforcement fibers when pressed against them. The second example of pins 19 as shown on the intermediate pad 3 have a cylindrical shape which offers good load distribution. The third example of pins 20 as shown in connection with the 5 front pad 11 has an inverse-conical shape which prevents unwanted loss of the reinforcement fibers as they tend to be pulled against the pad 11. If appropriate, the mechanical elements (i.e. the pins) can interact with an adjacent patch, e.g. in that they act as spacer. Alternatively or in addition, the mechanical elements of one patch may engage with thereto corresponding recesses in at least one next patch.

What is claimed is:

1. A wheel (1) comprising:
   a rim (2) and a wheel center (3), said wheel center (3) comprising an insert (10) with a front pad (11) and a rear pad (12), spaced a distance apart with respect to each other and which are at least partially embedded in a composite material (6) wherein at least one layer of reinforcing fibers (7) is arranged between the front pad (11) and the rear pad (12);
   the at least one layer of reinforcing fibers (7) arranged between the front pad (11) and the rear pad (12) attached to the rim; and
   the at least one layer of reinforcing fibers (7) extends across at least one transversal opening (26) in the rim (2).

2. The wheel (1) according to claim 1, wherein at least one intermediate pad (13) is arranged between the front pad (11) and the rear pad (12).

3. The wheel (1) according to claim 1, wherein the at least one layer of reinforcing fibers (7) is covered by additional layers of composite material from an outside of the rim.

4. The wheel (1) according to claim 1, wherein the front pad (11) and/or the rear pad (12) has an annular shape with a center opening (23).

5. The wheel (1) according to claim 4, wherein the front pad (11) and/or the rear pad (12) has a radial projection (24) which extends into the center opening (23) and merges into a support (25).

6. The wheel (1) according to claim 1, wherein the front pad (11) and/or the rear pad (12) is interconnected to the composite material (6) by at least one mechanical element (15, 18, 19, 20, 22).

7. The wheel (1) according to claim 1, wherein the front pad (11) and the rear pad (12) are interconnected to each other by at least one mechanical element (15, 18, 19, 20, 22).

8. The wheel (1) according to claim 6, wherein the at least one mechanical element comprises a bushing (15) and/or a filament (22) and/or a pin (19) and/or a pyramid (18) and/or an inverse-pyramid (20).

9. The wheel (1) according to claim 1, wherein the at least two pads comprises at least one peripheral opening (14) and/or at least one recess (21) which are arranged corresponding to each other to receive at least one mechanical element (15, 18, 19, 20, 22).

10. The wheel (1) according to claim 1, wherein the front pad (11) and/or the rear pad (12) is metal.

11. The wheel (1) according to claim 1, wherein the front pad (11) and/or the rear pad (12) comprises a sheet.

12. An insert (10) for a wheel (1), the wheel (1) having a rim (2) and a wheel center (3), the insert (10) comprising:
a front pad (11) and a rear pad (12), spaced a distance apart with respect to each other and which are at least partially embedded in a composite material (6) wherein at least one layer of reinforcing fibers (7) is arranged between the front pad (11) and the rear pad (12) and the front pad (11) and the rear pad (12) comprise at least one peripheral opening (14) and/or at least one recess (21) which are arranged corresponding to each other to receive at least one mechanical element (15, 18, 19, 20, 22) wherein the at least one layer of reinforcing fibers (7) extends across at least one transversal opening (26) in the rim (2).

13. A method for assembling a wheel (1) comprising the following method steps:

a. arranging a front pad and a rear pad (11, 12) of an insert (10) of an insert (10) of a wheel center of the wheel (1) the wheel (1) between several layers of reinforcing fibers (7);

b. arranging the pads (11, 12) and the layers of reinforcing fibers (7) in a mold; and c. curing a matrix material that embeds the reinforcing fibers;

wherein the reinforcing fibers are embedded in the matrix material either prior to or after step b.

14. The method according to claim 13, wherein at least one intermediate pad (13) is arranged between the front pad (11) and the read pad (12).

15. The method according to claim 13, wherein the pads are interconnected to each other by at least one mechanical element (15, 18, 19, 20, 22).

16. The method according to claim 15, wherein the at least one mechanical element is selected out of the group of the following elements: Filament (22), Bushing (15), Bolt, Pin (18, 19, 20).

17. The method according to claim 15, wherein the at least one mechanical element (15, 18, 19, 20, 22) is applied before and/or after the matrix is cured.

18. The method according to claim 13, wherein a pre-assembled rim is arranged in the mold before the matrix material is cured.

19. The method according to claim 18, wherein fibers (7) of a layer of reinforcing fibers are arranged in a transversal opening (26) and attached to the outside of the rim (2).

20. The method according to claim 19, wherein the fibers (7) are covered from the outside by an additional layer of material.

* * * * *